United States Patent
Christlieb et al.

(10) Patent No.: US 9,439,504 B1
(45) Date of Patent: Sep. 13, 2016

(54) JOB SITE WORKSTATION

(71) Applicant: SiteSmart, LLC, New Lenox, IL (US)

(72) Inventors: Robert Christlieb, McFarland, WI (US); William Lowden, New Lenox, IL (US)

(73) Assignee: SITESMART, LLC, New Lenox, IL (US)

( * ) Notice: Subject to any disclaimer, the term of this patent is extended or adjusted under 35 U.S.C. 154(b) by 418 days.

(21) Appl. No.: 13/833,711

(22) Filed: Mar. 15, 2013

Related U.S. Application Data

(60) Provisional application No. 61/642,581, filed on May 4, 2012, provisional application No. 61/650,116, filed on May 22, 2012.

(51) Int. Cl.
*A47B 21/04* (2006.01)
*A47B 21/007* (2006.01)
*H05K 5/00* (2006.01)
*H05K 5/02* (2006.01)

(52) U.S. Cl.
CPC ........... *A47B 21/04* (2013.01); *A47B 21/0073* (2013.01); *H05K 5/0017* (2013.01); *H05K 5/0213* (2013.01)

(58) Field of Classification Search
CPC .................. A47B 21/0073; A47B 2021/0076; A47B 2200/0073; G06F 1/1601
USPC ................... 361/679.02; 312/223.3
See application file for complete search history.

(56) References Cited

U.S. PATENT DOCUMENTS

| | | | |
|---|---|---|---|
| 1,850,487 A * | 3/1932 | Young | 312/24 |
| 2,013,542 A * | 9/1935 | Nordmark | 108/3 |
| 4,562,482 A * | 12/1985 | Brown | 348/836 |
| 4,571,456 A | 2/1986 | Edens et al. | |
| 4,695,104 A * | 9/1987 | Lederman | 312/223.3 |
| 4,735,467 A * | 4/1988 | Wolters | 312/29 |
| 4,827,410 A * | 5/1989 | Corren | 715/840 |
| 5,033,804 A * | 7/1991 | Faris | 312/223.3 |
| 5,071,204 A * | 12/1991 | Price et al. | 312/194 |
| 5,368,377 A * | 11/1994 | Baines | 312/27 |
| 5,410,972 A * | 5/1995 | Schairbaum | 108/50.01 |
| D381,529 S * | 7/1997 | Ugalde | D6/642 |
| 5,724,064 A * | 3/1998 | Stefik et al. | 345/105 |

(Continued)

OTHER PUBLICATIONS

"Samsung Introduce YOUM Unbreakable Flexible AMOLDED Display Product", www.oled-display.net, Apr. 7, 2012.

(Continued)

*Primary Examiner* — Adrian S Wilson
(74) *Attorney, Agent, or Firm* — Andrus Intellectual Property Law, LLP

(57) ABSTRACT

A mobile workstation includes a body that defines an open interior. A lid is movably connected to the body. The lid is movable between an open position and a closed position. A bracket is secured to the body and at least partially disposed within the open interior. The bracket is movable with respect to the body such that the bracket moves from a storage configuration when the bracket is positioned within the open interior and an active configuration in which at least a portion of the bracket extends outwardly from the open interior when the lid is in the opened position. A graphical display is configured to be removably coupled to the front face of the bracket. The bracket is configured to removably receive the graphical display. The graphical display moves in conjunction with the bracket between the storage configuration and the active configuration.

20 Claims, 10 Drawing Sheets

(56) References Cited

U.S. PATENT DOCUMENTS

| | | | | |
|---|---|---|---|---|
| 5,746,489 | A * | 5/1998 | Moon | 312/223.3 |
| 5,859,762 | A * | 1/1999 | Clark et al. | 361/679.41 |
| 5,957,059 | A * | 9/1999 | Burhman | 108/13 |
| 5,961,192 | A | 10/1999 | Bernart et al. | |
| 6,109,434 | A | 8/2000 | Howard, Jr. | |
| 6,237,507 | B1 * | 5/2001 | Yanagisawa et al. | 108/3 |
| 6,286,440 | B1 * | 9/2001 | Jyringi | 108/50.01 |
| 6,577,496 | B1 * | 6/2003 | Gioscia et al. | 361/679.3 |
| 6,609,465 | B2 * | 8/2003 | Kolavo | 108/50.01 |
| 6,820,562 | B2 * | 11/2004 | Zodnik et al. | 108/50.01 |
| 6,961,586 | B2 | 11/2005 | Barbosa et al. | |
| 7,100,516 | B2 * | 9/2006 | Riddiford et al. | 108/50.01 |
| D536,193 | S * | 2/2007 | Sapp | D6/656.16 |
| 7,278,644 | B2 * | 10/2007 | Villarreal | 280/47.26 |
| 7,327,562 | B2 * | 2/2008 | Littlepage | 361/679.55 |
| 7,339,783 | B2 | 3/2008 | McEwan et al. | |
| 7,489,503 | B2 * | 2/2009 | Maatta | 361/679.27 |
| 7,509,912 | B2 * | 3/2009 | Stengel et al. | 108/50.01 |
| 7,584,830 | B2 * | 9/2009 | Smith | 190/11 |
| 7,621,544 | B2 | 11/2009 | Rossini | |
| 7,757,612 | B2 * | 7/2010 | Korber et al. | 108/25 |
| 7,784,412 | B2 * | 8/2010 | Korber et al. | 108/25 |
| 7,791,866 | B2 | 9/2010 | Clark et al. | |
| 7,843,686 | B2 | 11/2010 | McEwan et al. | |
| 7,907,393 | B2 * | 3/2011 | Sellers | 361/679.27 |
| D652,229 | S * | 1/2012 | Madison | D6/655 |
| 8,109,421 | B2 | 2/2012 | McLean et al. | |
| 8,250,993 | B2 * | 8/2012 | Griepentrog et al. | 108/25 |
| 8,356,779 | B2 * | 1/2013 | Stengel | 248/125.3 |
| 8,441,782 | B2 * | 5/2013 | Thomas | 361/679.02 |
| 8,596,204 | B2 * | 12/2013 | Costamagna | 108/6 |
| 8,616,354 | B2 * | 12/2013 | Azirian | 190/11 |
| 8,695,510 | B2 * | 4/2014 | Johnson et al. | 108/50.02 |
| 8,749,959 | B2 * | 6/2014 | Riley et al. | 361/679.02 |
| 8,787,008 | B2 * | 7/2014 | Walters et al. | 361/679.21 |
| 8,953,308 | B2 * | 2/2015 | Riley et al. | 361/679.02 |
| 2004/0000258 | A1 * | 1/2004 | Riddiford et al. | 108/50.01 |
| 2004/0007949 | A1 * | 1/2004 | Holt | 312/223.3 |
| 2004/0052037 | A1 * | 3/2004 | Sawyer | 361/681 |
| 2004/0061683 | A1 * | 4/2004 | Mochizuki et al. | 345/168 |
| 2004/0226791 | A1 * | 11/2004 | Levy | 190/11 |
| 2005/0145142 | A1 * | 7/2005 | Korber et al. | 108/50.01 |
| 2005/0174366 | A1 * | 8/2005 | Wu et al. | 345/905 |
| 2006/0050169 | A1 * | 3/2006 | Misawa | 348/333.06 |
| 2006/0124822 | A1 * | 6/2006 | Munda et al. | 248/454 |
| 2007/0069975 | A1 * | 3/2007 | Gettemy et al. | 345/1.3 |
| 2007/0157856 | A1 * | 7/2007 | Skoog et al. | 108/70 |
| 2007/0211036 | A1 * | 9/2007 | Perkins | 345/173 |
| 2007/0227923 | A1 * | 10/2007 | Kidakarn | 206/320 |
| 2007/0285886 | A1 * | 12/2007 | Huang | 361/687 |
| 2008/0096673 | A1 * | 4/2008 | Lube | 463/47 |
| 2008/0151480 | A1 * | 6/2008 | Chung et al. | 361/681 |
| 2008/0158795 | A1 * | 7/2008 | Aoki et al. | 361/681 |
| 2008/0167095 | A1 * | 7/2008 | Kim et al. | 455/575.3 |
| 2008/0192424 | A1 * | 8/2008 | Lee | 361/683 |
| 2008/0247126 | A1 * | 10/2008 | Otsuka et al. | 361/681 |
| 2010/0052486 | A1 * | 3/2010 | Hemmer | 312/223.3 |
| 2010/0082842 | A1 | 4/2010 | Lavrov et al. | |
| 2012/0035906 | A1 * | 2/2012 | Jephcott | 704/2 |
| 2012/0250238 | A1 * | 10/2012 | Cao | 361/679.21 |

OTHER PUBLICATIONS

Glacier Computer, "Portable Tablet T507K" Brochure, www.glaciercomputer.com 2011.

NEXCOM—KPPC 1552 Brochure, www.nexcomm.com, 2013.

Motion Computing—MOTION J3600 Brochure, www.motioncomputing.com, 2013.

Chassis Plans—"Rugged COTS Computer Systems and LCD Monitors", Brochure, www.chassis-plans.com, 2013.

* cited by examiner

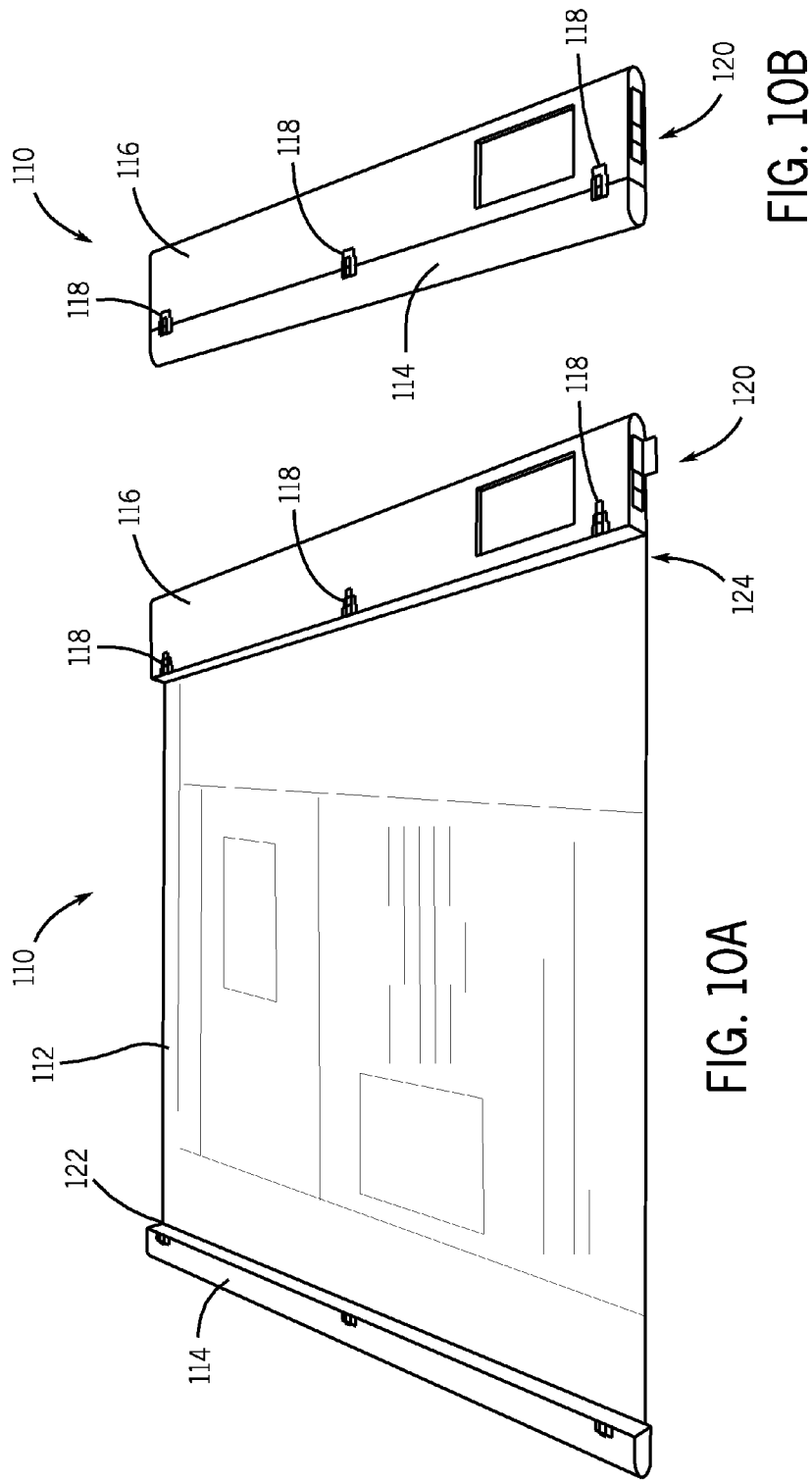

JOB SITE WORKSTATION

CROSS REFERENCE TO RELATED APPLICATION

This application relates to and claims priority from U.S. Provisional Application Ser. No. 61/642,581 filed on May 4, 2012 and 61/650,116 filed on May 22, 2012, which are hereby incorporated by reference in their entirety.

BACKGROUND

The present disclosure is related to the field of protective equipment. More specifically, the present disclosure if related to a protective mobile workstation.

Construction, manufacturing or industrial job sites can present extreme conditions either in the form of exposure to the elements such as sun, wind, rain and dust or dirt from the construction site and heat or tailings or other debris in an industrial location. Both construction and industrial job sites present a risk of physical damage to electronics, such as from impact from machinery or supplies used at the job site.

Often because of these conditions, paper copies of specifications and plans are used at the job site. While these specifications and/or plans are digitally designed, edited, and stored, paper copies must be printed out and maintained at the job site and new copies are printed if one set of plans or specifications are damaged by the harsh conditions.

One disadvantage of this is that as a project develops often changes are made to the specification or plans, changes which are not reflected in the paper copies at the job site if the changes originate from a design office remotely located from the job site. In the event that personnel at the job site identify changes or changing conditions in the project at the job site, it can be difficult to relay these changes back to the remotely located design office such that the master plans or specifications for the project can be updated to reflect the realities experienced at the job site.

BRIEF DISCLOSURE

An embodiment of a workstation includes a body defining an open interior. A lid is movably connected to the body. The lid is movable between an open position and a closed position. A bracket is secured to the body and to at least partially disposed within the open interior. At least a portion of the bracket is movable with respect to the body such that the bracket moves from a storage configuration wherein the bracket is positioned within the open interior and an active position in which at least a portion of the bracket extends outwardly from the open interior when the lid is in the open position. A front face of the bracket is configured to couple to a graphical display.

An exemplary embodiment of a mobile workstation system includes a body defining an open interior. A lid is movably connected to the body. The lid is movable between an open position and a closed position. A bracket is secured to the body and at least partially disposed within the open interior. At least a portion of the bracket is movable with respect to the body such that the bracket moves from a storage configuration wherein the bracket is positioned within the open interior and an active position in which at least a portion of the bracket extends outwardly from the open interior when the lid is in the open position. A graphical display is coupled to the front face of the bracket. The graphical display moves in conjunction with the bracket between the storage configuration and the active configuration. A computer processor is disposed within the open interior. The computer processor is communicatively connected to the graphical display and operates the graphical display to present project data. A communication device is disposed within the open interior. The communication device is communicatively connected to the computer processor. A project information management (PIM) server is communicatively connected to the computer processor through the communication device. An office workstation is remotely located from the computer processor and is communicatively connected to the PIM server wherein project data from the office workstation is transferred to the computer processor through the PIM server.

An exemplary embodiment of a movable workstation system includes a body defining an open interior. A lid is movably connected to the body. The lid is movable between an open position and a closed position. A bracket is secured to the body and at least partially disposed within the open interior. The bracket includes a front face directed outward from the open interior and a back face directed inwards to the open interior. At least a portion of the bracket is movable with respect to the body such that the bracket moves from a storage configuration wherein the bracket is positioned within the open interior and an active position in which at least a portion of the bracket extends outwardly from the open interior when the lid is in the open position. A graphical display is configured to be removably coupled to the front face of the bracket wherein the bracket is configured to removably receive the graphical display. The graphical display coupled to the front face of the bracket moves in conjunction with the bracket between the storage configuration and the active configuration.

BRIEF DESCRIPTION OF THE DRAWINGS

FIG. 10A depicts an exemplary alternative embodiment of a graphical display in an open position.

FIG. 10B depicts an exemplary alternative embodiment of a graphical display in a closed position.

DETAILED DISCLOSURE

Figure 1:
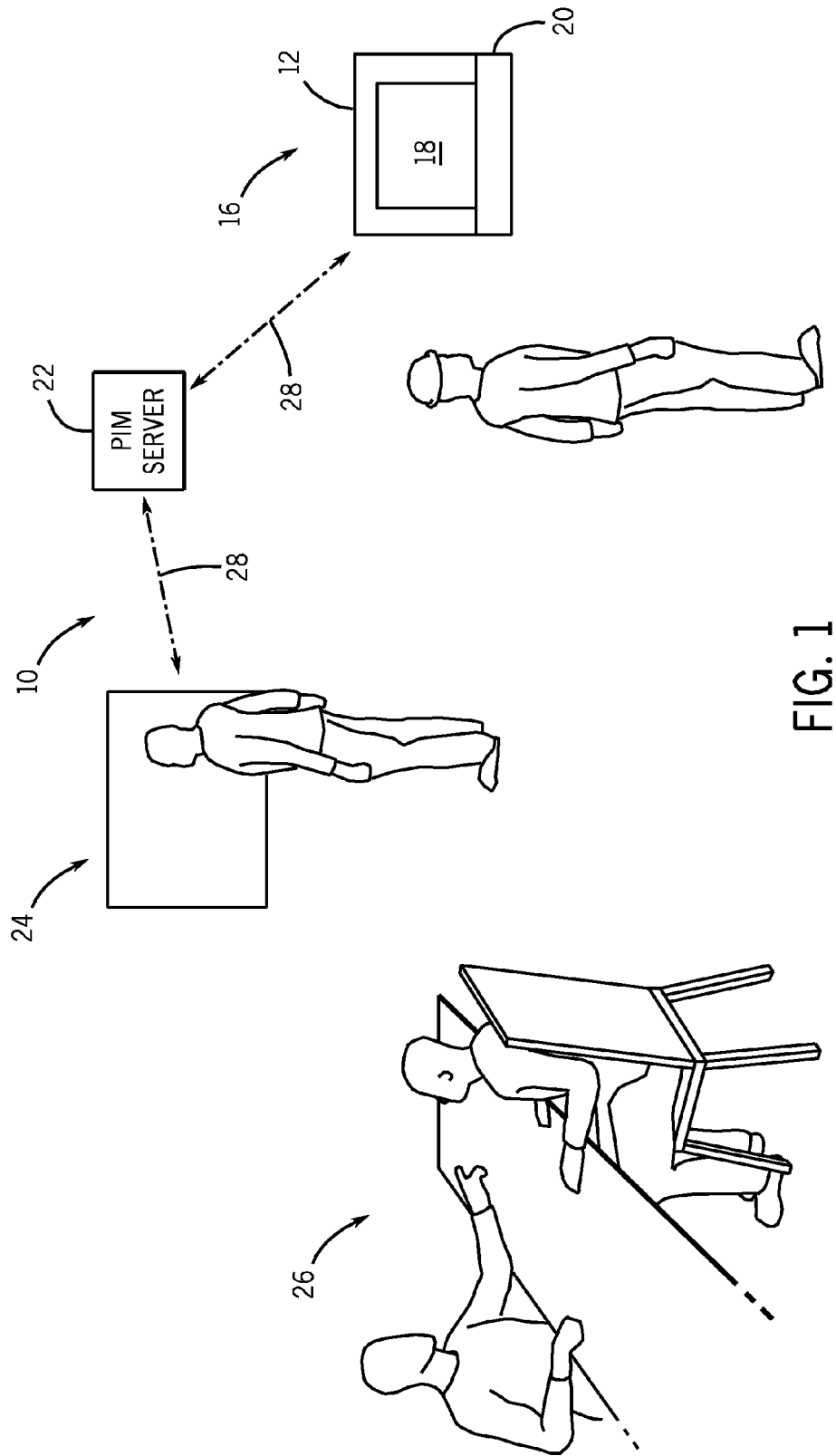
FIG. 1 is a system diagram of an exemplary embodiment of a project information management network.

FIG. 1 is a system diagram that depicts an example of one embodiment of a project information management (PIM) network 10. The PIM network 10 includes a mobile job site workstation 12. The mobile job site workstation 12 is mobile such that it can travel with a person such as a job site manager 14 to a construction or industrial job site 16. Embodiments of the mobile job site workstation 12 will be disclosed in greater detail herein; however, as depicted in FIG. 1, the mobile job site workstation 12 includes a display 18 and a protective case 20. The job site workstation 12 is communicatively connected to a project information management (PIM) server 22. As described in further detail herein, the PIM server 22 stores project related information, including specifications, diagrams, and construction, building, or product plans. The PIM server 22 is communicatively connected to an office workstation 24 where design or planning personnel 26 can edit or modify the project information stored on the PIM server 22, such that the edited and/or modified project information is accessible by the mobile job site workstation 12.

It is to be understood that in embodiments, the office workstation 24, PIM server 22, and mobile job site workstation 12 can all be remotely located from one another and are communicatively connected through communication connections 28. The communication connections 28, as will be described in further detail herein, can be any of a variety of electronic communication connections, including wired and/or wireless communication platforms. As a non-limiting example, wireless communication connections can include Wi-Fi or cellular communications connections. The communication connections 28 provide for bi-directional communication between the office workstation 24 and the mobile job site workstation 12 with the PIM server 22.

Figure 2:
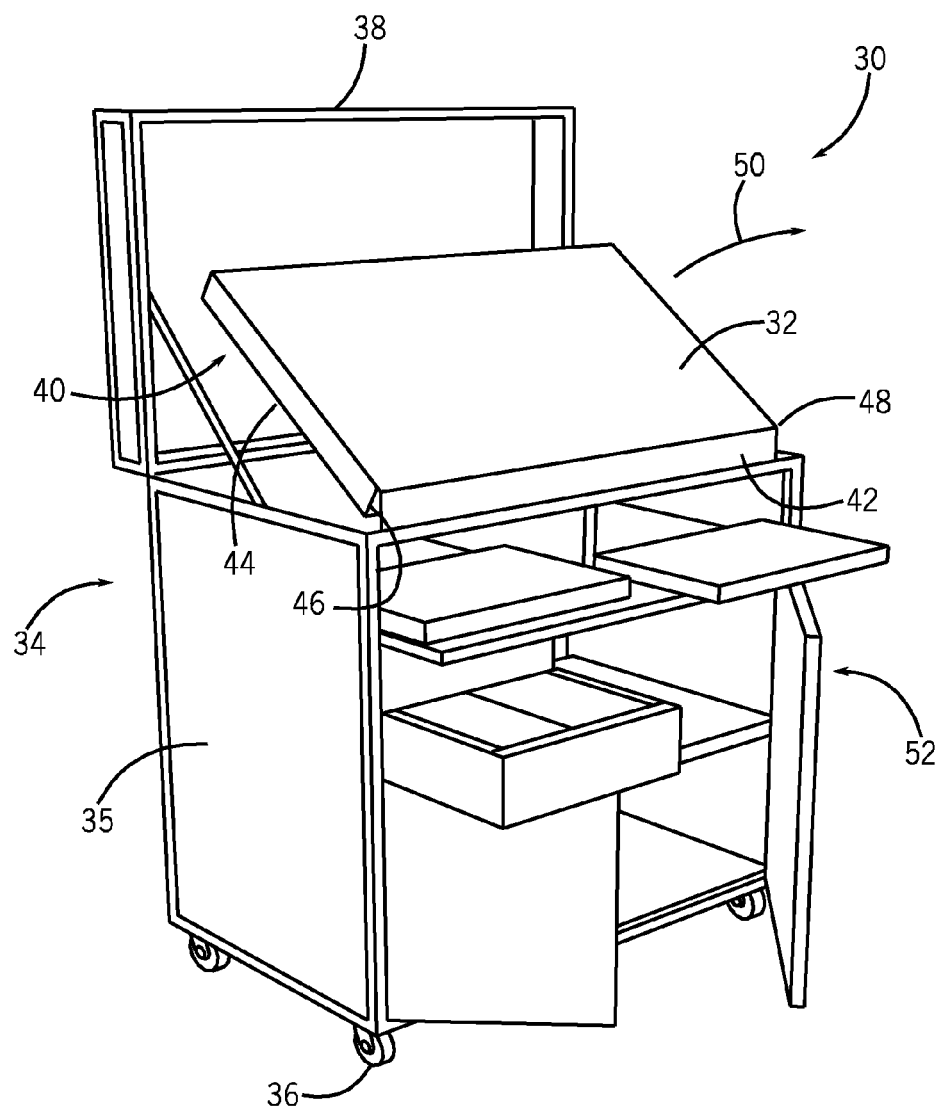
FIG. 2 depicts an exemplary embodiment of a job site workstation.

FIG. 2 depicts one embodiment of a job site workstation 30. The job site workstation 30 includes a display 32 that is a digital screen, exemplarily a high definition (H-ID) display. In one embodiment, the display 32 is a 27 inch HD monitor. This dimension of display permits the presentation of full sized half scale drawings such as may be used at a job site. In an alternative embodiment, a 46 inch graphical display is used as full 24 inch×36 inch drawings can be presented on a graphical display of this size. While these dimension are exemplarily provided, the graphical display can be scaled to suit user needs depending upon graphical requirements. An HD display, such as one featuring 1080p resolution presents the digital project plans or other information in a clear and readable format. In one embodiment, the display is an LED back lit display due to the low power consumption provided by this type of device; however, it will be recognized that other graphical displays, including other low power consumption graphical displays can alternatively be used, particularly as technology improves. In still further embodiments of the display 32, the display has a large viewing angle, exemplarily, but not limited to, 178° viewing angle.

The job site workstation 30 includes a case 34 that in an exemplary embodiment includes a body 35 hingedly connected to a lid 38.

The display 32 is housed in the case 34, which in the embodiment depicted, is exemplarily a cart. In an embodiment, the case 34 configured to meet the standards to be rated as a travel case by the American Transportation Association (ATA). The case 34 includes wheels 36 to facilitate movement of the job site workstation 30.

An embodiment of the lid 38 of the job site workstation 30 operates between a closed position in which the lid 38 is secured to a body 35 at the non-hinged side and an open position in which the lid 38 is picoted away from the body 35. The job site workstation 30 includes a bracket 40 as will be described in further detail herein that pivotably secures the display 32 to the body 35 of the case 34. The bracket 40 permits the display 32 to be pivoted into a storage position at least partially disposed within the body 35 for protection as will be described in greater detail herein during transportation and storage of the job site workstation 30. The bracket 40 further pivots to a display position in which the display 32 is at least partially outside of the body 35 of the case 34 with a lid 38 in the open position to facilitate viewing and use of the display 32 by the job site manager or other personnel.

Figure 3:
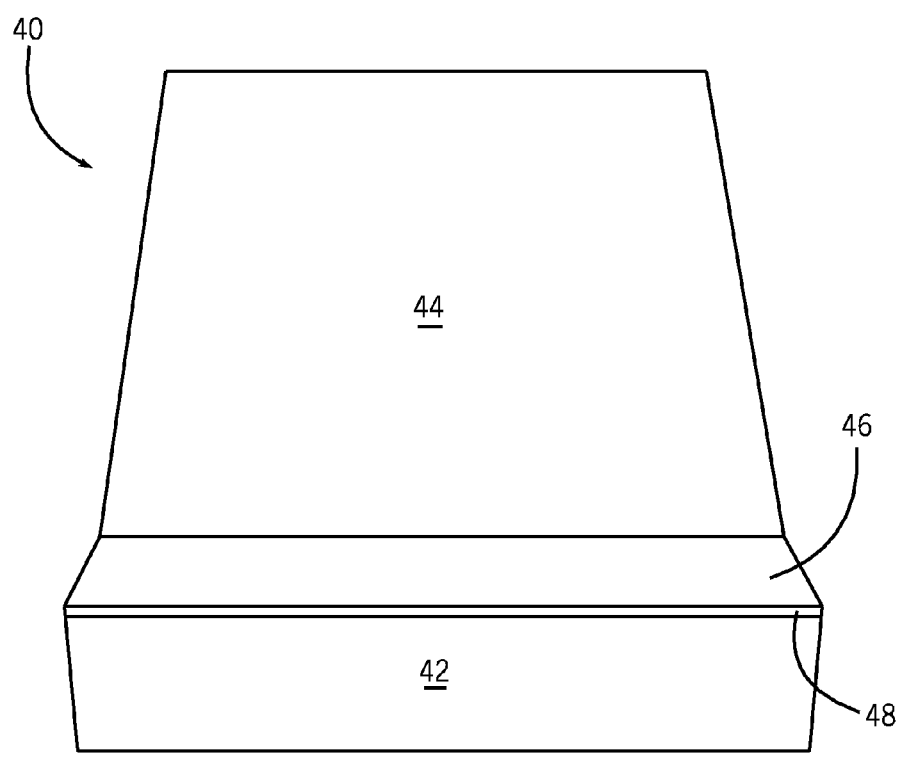
FIG. 3 is a front view of an exemplary embodiment of a bracket.

FIG. 3 is a detailed view of one embodiment of the bracket 40 as may be exemplarily used with embodiments of the job site workstation 30. The bracket 40 includes a front plate 42 that is secured to the body 35 of the case 34. A back plate 44 is configured to secure to the back of the display 32 and to secure the display 32 to the bracket 40, and thus to the case 34. A bottom plate 46 is fixedly secured to the back plate 44 and pivotably secured to the front plate 42 by means of a hinge 48. The bottom plate 46 provides further support to the display 32 mounted to the back plate 44 and facilitates pivotal movement of the bottom plate 46 and back plate 44 in relation to the front plate 42 about the hinge 48. Referring back to the embodiment of the job site workstation 30 depicted in FIG. 2, the display 32 is able to rotate due to the bracket 40 in the direction of arrow 50 to a variety of angles in the display position such as to facilitate viewing of the project information by one or more job site personnel.

The embodiment of the job site workstation 30 can include cabinetry or other secured storage 52. The secured storage 52 can be located in the body 35 and include space to store other electronic equipment, such as a computer to be described in further detail herein, such as would be used to provide the functionality of the job site workstation 30, a printer (not depicted), or user input devices, exemplarily a keyboard or mouse (not depicted). Embodiments of the secured storage 52 may include appropriate power and data connections for these pieces of equipment.

While not depicted in FIG. 2, some embodiments of the job site workstation 30 includes a dedicated processor or CPU that is integrated into the job site workstation 30 and is communicatively connected to the display 32. In an alternative embodiment, the job site workstation 30 further includes a docking station (not depicted), such that a laptop computer, smart phone or tablet computer of a job site personnel can be communicatively connected to the display 32, and provide the processing power, and software functionality used by the job site workstation 30. In still further embodiments, a data communication cable (not depicted), exemplarily an HDMI cable, is provided from the display 32 for connection to a separate computer as an alternative to a full docking station. In embodiments, whichever processing arrangement is used (integrated CPU or docking station) embodiments of the job site workstation 30 include a data connection which may be a wired or a wireless data connection. In embodiments, the laptop computer or smart phone may provide the data connection to the job site workstation 30. Non-limiting examples of a wireless data connection may include Wi-Fi, broadband card, or cellular communication platforms, while a wired data connection may include a port for Ethernet or other broad band data connections. Through this data connection, the job site workstation 30 can communicatively connect to the PIM server 22 (depicted in FIG. 1).

As previously mentioned, some embodiments of the job site workstation 30 can include a keyboard, mouse, or touch pad as a user input device. In still other embodiments, the display 30 is a touch screen display that replaces the need for other user input devices such as the keyboard and mouse. In still further embodiments, the job site workstation 30 includes a web-enabled digital video camera. Such a video camera can enable video conferencing between the job site workstation 30 and the design personnel 26 at the remotely located office workstation 24.

Due to the nature of job site locations, embodiments of the job site workstation 30 include one or more of a variety of power sources, such that various power sources can be relied upon at different times as dictated by convenience or availability. In one embodiment, a standard 120 volt electrical connection with surge protection isolation is provided that can be connected to an electrical generator or utility electrical service. Still other embodiments include battery or battery backup. In one such embodiment, the job site workstation may be configured to operate on 120 volt utility electricity when available, while maintaining reserve batteries charged in the event of a loss of electrical power. In still further embodiments, a 250 watt inverter such as to facilitate connection to an electrical outlet of a vehicle may also be used.

Figure 4:
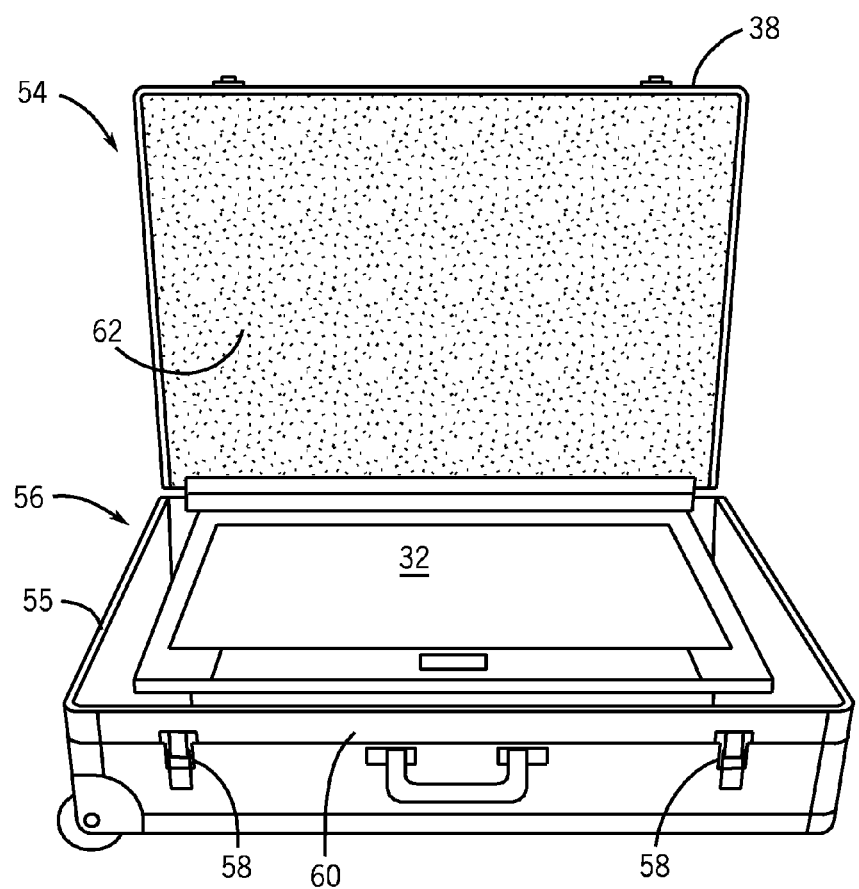
FIG. 4 is an isometric view of an exemplary embodiment of a workstation in the storage configuration.

FIGS. 4-7 depict one embodiment of a job site workstation 54. FIG. 4 is a front view of the job site workstation 54 with the lid 38 in the opened position and the display 32 pivoted interior the body 55 of case 56 in a stored position. As can be seen in FIG. 4, the case 56 includes latches 58 which operate to secure the lid 38 to the body 55 of the case 56 when the lid 38 is in the closed position. As will be detailed further herein, the workstation 54 includes a number of features such as to protect the display 32 from physical damage, starting with the hard exterior 60 of the case 56. Padding, exemplarily corrugated foam padding 62 is located in the underside of the lid 38 to contact and pad the display 32 when the lid 38 is in a closed position.

Figure 5:
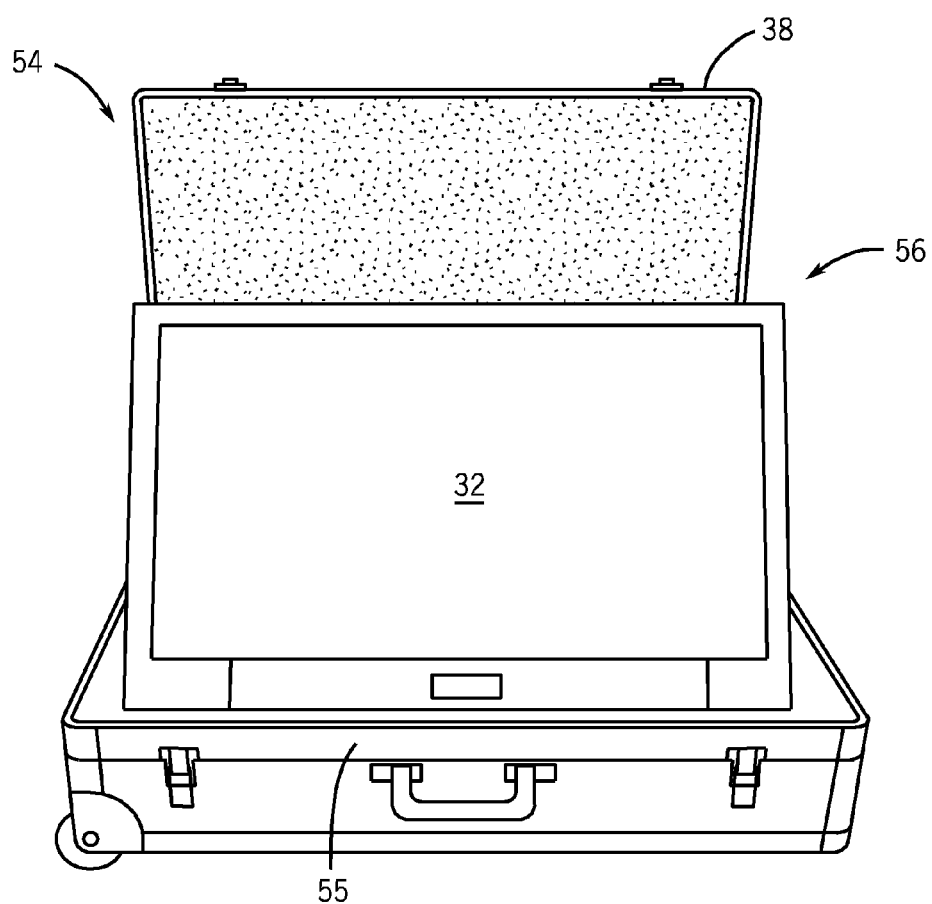
FIG. 5 is an isometric view of an embodiment of a workstation in the active configuration.

FIG. 5 depicts an embodiment of the job site workstation 54 when the display 32 is pivoted to the active position and extends at least partially outside of the case 56.

Figure 6:
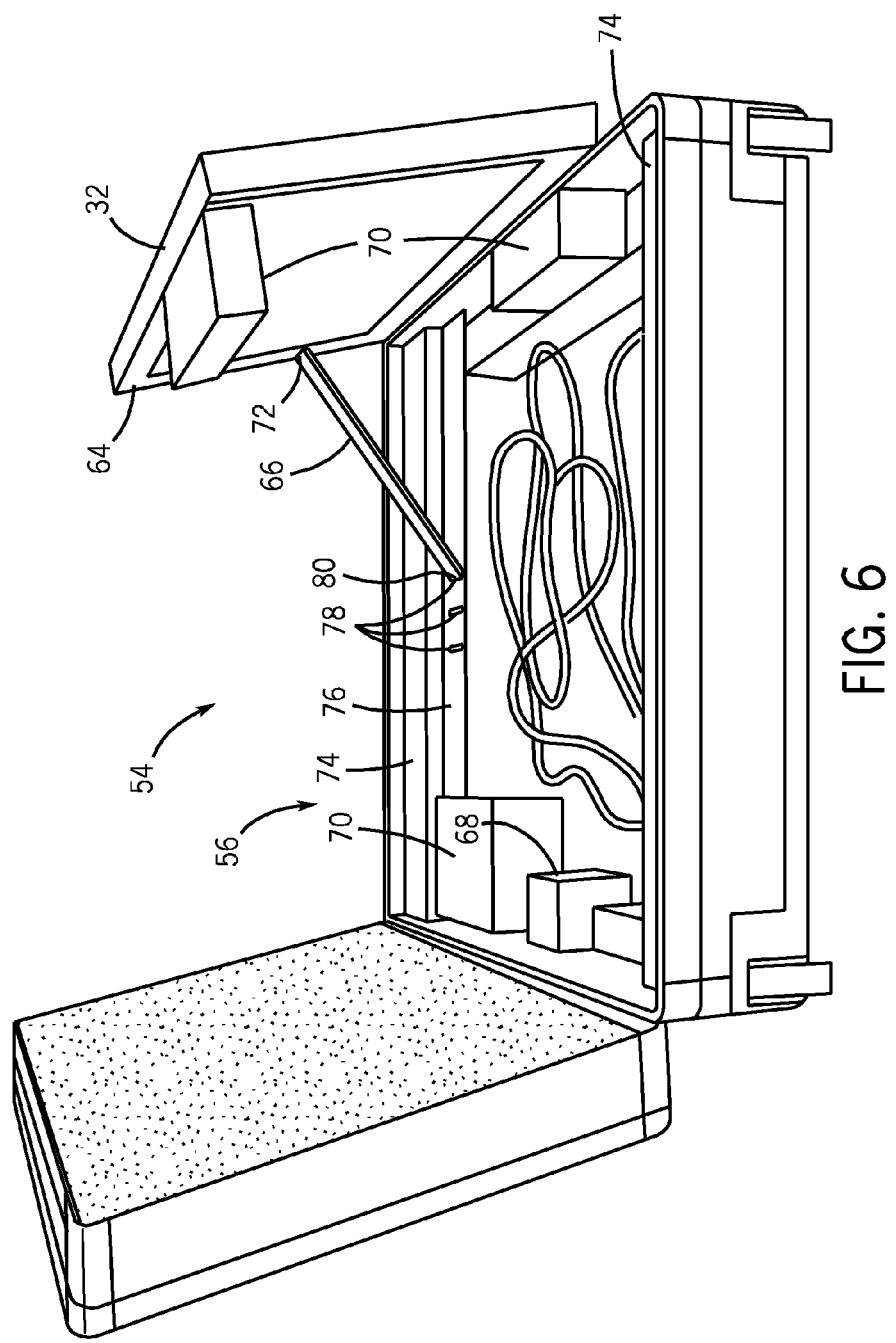
FIG. 6 is a top view of an exemplary embodiment of a workstation in the active configuration.

FIG. 6 is a top view of the job site workstation 54 wherein the display 32 is fully pivoted in the active position exterior the case 56 by the bracket 64 (exemplarily described above with respect to FIG. 3). The display 32 is held in the active position by a brace 66 that is secured to the bracket 64 by means of a hinge 72. The brace 66 will be described in further detail herein.

Located in the interior of the body 55 of the case 56 can be seen the 120 volt power supply/surge protector 68 that can be used to connect to an external source of power and provide power internally to the computer (not depicted) and the display 32.

Foam blocks 70 are strategically arranged within the body 55 of the case 56 as well as secured to the bracket 64 on a side of the bracket 64 opposite to which the display 32 is mounted. The foam blocks 70 provide resilient support to hold the display 32 in place when it is pivoted into the case 56, while also defining a cavity within the case 56 suitably sized for the wires, dock, and/or CPU depending upon the embodiment.

Foam bars 74 are mounted to the interior of the case 56 at such positions to engage the bracket 64 to which the display is mounted. The foam bars 74 are dimensioned to compliment the foam blocks 70 located elsewhere on the bracket 64 or within the case 56.

The brace 66 engages a positionable bar 76 that is located horizontally within the case 56 and includes a plurality of slots 78 located at varying positions along the bar 76. The brace 66 includes a tab 80 that engages one of the slots 78 at a time. The engagement of a slot 78 with the tab 80 secures the brace 66 at a specified angle with the display, and defining the angle at which the display (not depicted) is supported exterior the case 56.

Figure 7:
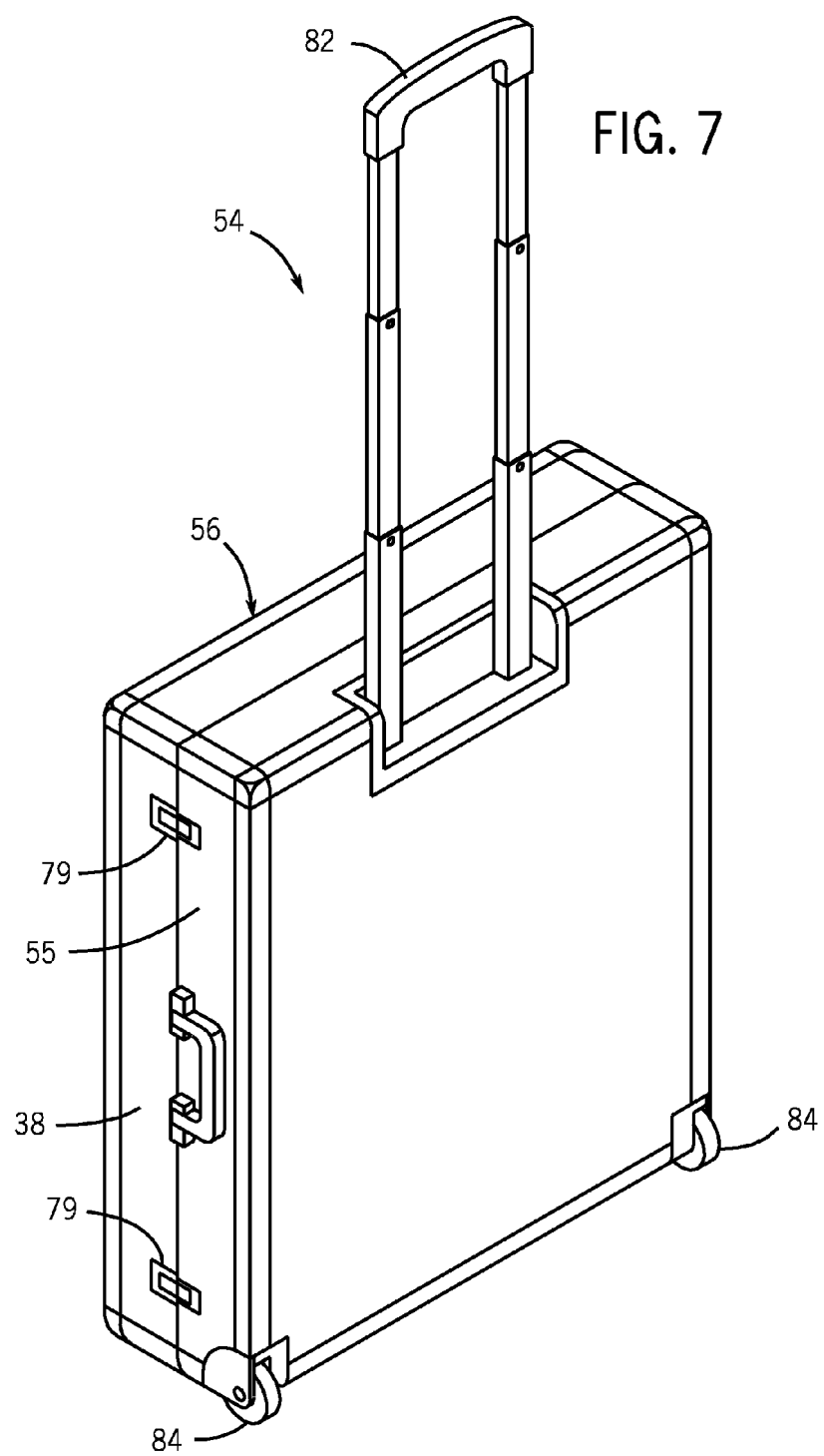
FIG. 7 is an isometric view of an exemplary embodiment of the workstation with the lid in the closed position.

FIG. 7 is an isometric view of an embodiment of the job site workstation 54 in the stored configuration wherein the display is secured within the case 56 and the lid 38 is in the closed position and latched to the body 55 by latches 79. The case 56 includes wheels 84, such as to facilitate movement of the job site workstation 54. Also, a retractable handle 82 extends from the case 56 to facilitate transportation.

Embodiments of the job site workstation as described herein facilitate the collaboration and transfer of plans and other job site information (collectively, "project data") between the job site and an office during a project. In an embodiment, the job site workstation operates project information management software, exemplarily the MySmartPlans software available from MySmartPlans of Kansas City, Mo. The project information management software enables the opening and editing of a variety of file types and extensions to enable the communication from the field to the office and visa versa. These file types and extensions include dwg, pdf, and bim file extensions.

Referring to FIG. 1, the transmission of data between the PIM server 22 and the job site workstation 12 can be implemented in a number of ways, including real time transmission across communication connections 28, download and upload through an FTP server operated on the PIM server 22, or scheduled or on command updating of files between the job site workstation and the PIM server 22. In still further embodiments, changes to the project data can be stored at the PIM server 22 when the job site workstation 12 is without communication connectivity. When communication is re-established, the updated project data can be downloaded to the job site workstation 12. Similarly, and changes to the project data made at the job site workstation 23 when data communication is not available can be locally stored and uploaded to PIM server 22 when communication is re-established. The job site workstation 12 can also operate off of locally stored files in the event that communication connection 28 is down or unavailable. In embodiments, the job site workstation can store local copies of the most recently received versions of any project files, copies of which can be accessed and referenced independent of a communication connection with the PIM server 22.

While not depicted, a still further embodiment of the job site workstation further includes an environmental control apparatus which exemplarily comprises an environmental shield such as a flexible or semi-flexible plastic barrier that either extends from the job site workstation, or about the job site workstation. In a further embodiment, the environmental shield extends about the open interior and about the graphical display, computer processor, and communication device. The environmental control barrier creates a microenvironment about the job site workstation, or at least partially about the job site workstation, namely the electronics of the job site workstation. In addition to the defined microenvironment, an active (e.g. electrical static or ionic filter) or passive air filter (e.g. HEPA filter) conditions the air before it is received within the microenvironment. These precautions can help to protect the job site workstation from the elements and/or other conditions at the construction or industrial job site and protect the electronic components, when the electronic components are secured within the case.

Figure 8:
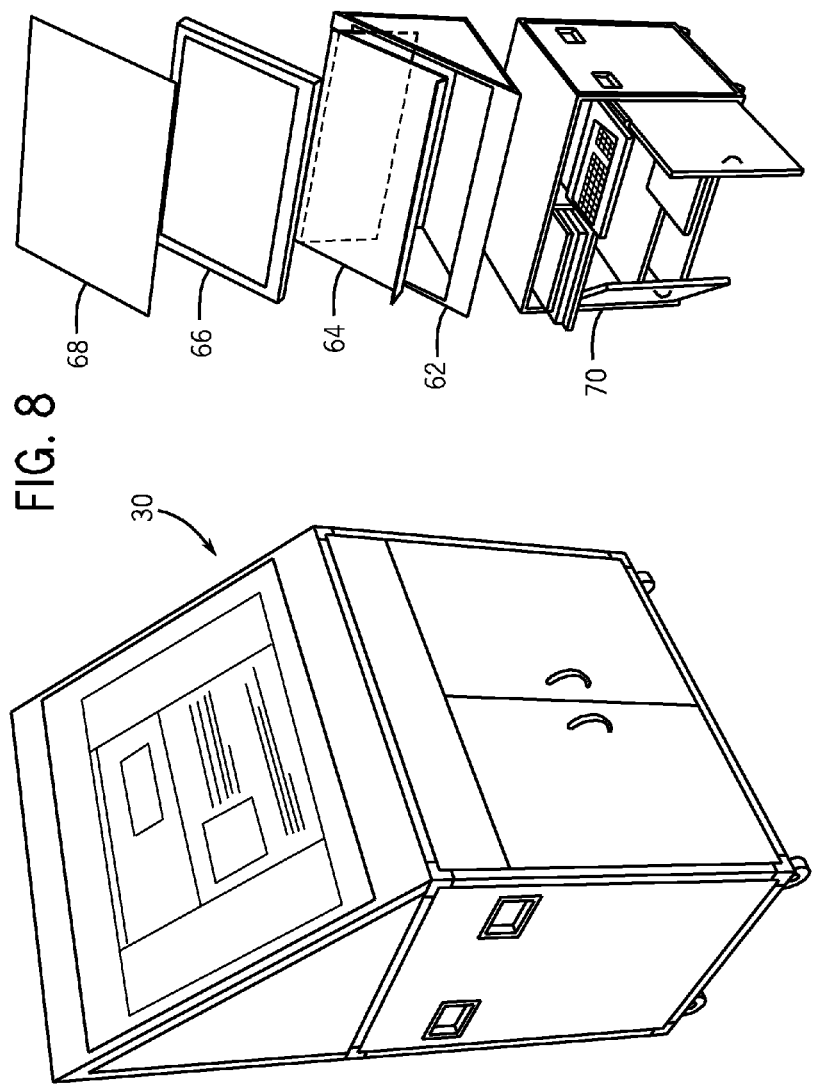
FIG. 8 is an exploded view of an exemplary embodiment of a workstation.

FIG. 8 depicts a still further embodiment of a job-site workstation 30. The job-site workstation 30 includes a slanted housing 62 that secures on top of a movable case 70. An angled support 64 is located within the slanted housing 62. The angled support is configured to receive and hold a graphical display 66 in an angled position within the slanted housing 62. A display shield 68, which in embodiments may include glass or polycarbonate, or any other suitable material secures to the slanted housing 62 disposed over the graphical display 66, such as to further provide a protection to the graphical display 66. In an embodiment, the display shield 68 may be a part of the environmental shield. In still further embodiments, the display shield 68 may be constructed in a manner such as to impart other desirable properties including glare or scratch resistance. In another embodiment, the display shield may be confined to transfer touch-sensitive controls, such that touch sensitive graphical display can be used beneath the display shield 68.

Figure 9:
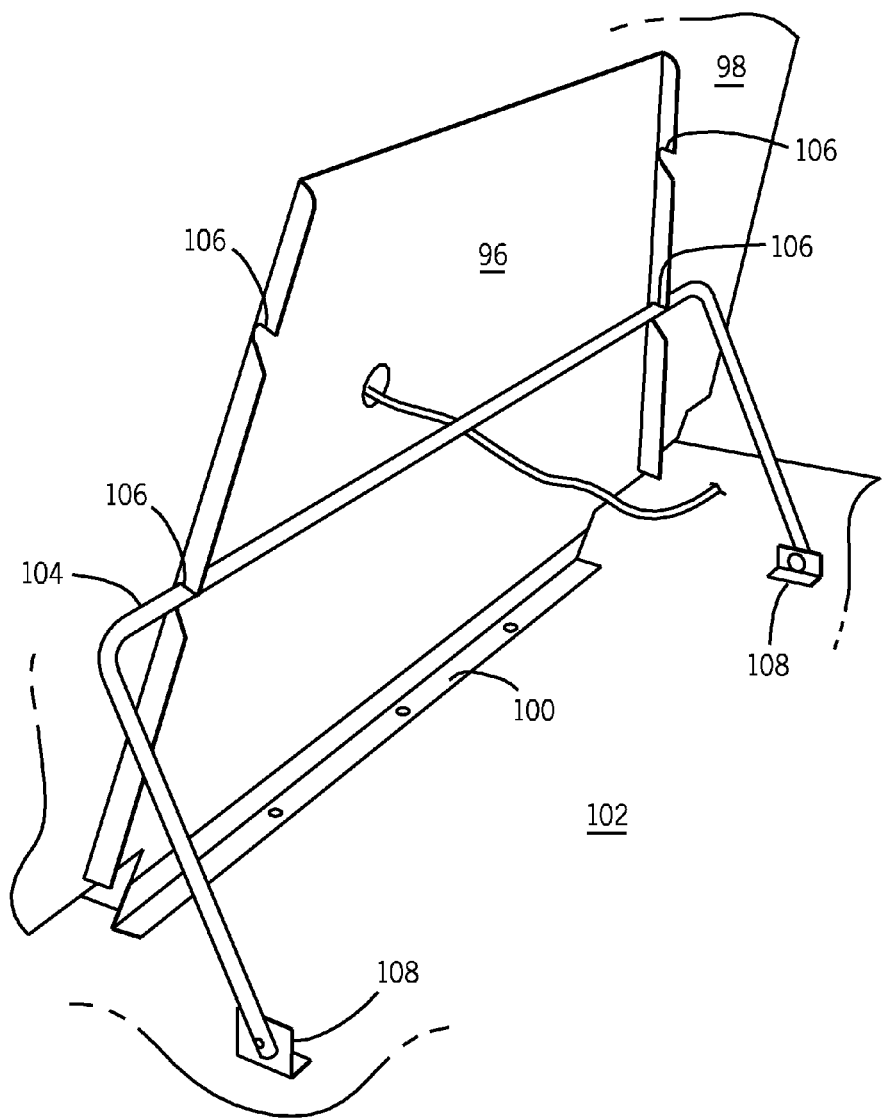
FIG. 9 is an isometric view of an alternative embodiment of a bracket.

FIG. 9 depicts an alternative embodiment of a bracket for pivotally mounting a graphical display 98 within a case 102 as disclosed herein. The bracket 96 is secured to the back of the graphical display 98 and a hinge 100 pivotally secures the bracket 96 to the interior of the case 102. An alternative configuration of a brace 104 is pivotally connected to the interior of the case 102 by one or more pivots 108 such that both the brace 104 and the bracket 96 are pivotally movable with respect to the case 102. The brace 104 engages one or more alternative configurations of slots 106 formed in the bracket 96 in such a manner as to define various angles at which the graphical display 98 is secured for viewing and use as described above.

FIGS. 10*a* and 10*b* depict an exemplary alternative embodiment of a graphical display that may be used in conjunction with embodiments of the job site workstation as disclosed herein. The graphical display 110 incorporated a flexible active-matrix organic light-emitting diode (AMO LED) display 112 that extends between separable first support 114 and second support 116. The flexible AMO LED display 112 can exemplarily be secured at a first end 122 to the first support 114 and may be connected at a second end 124 to the second support 116. In embodiments, the flexible AMO LED 112 is retractable into the second support 116. In such an embodiment, the second end 124 is movably secured to the second support 116 and the second support 116 is configured with a space or recess (not depicted) configured to receive the retracted flexible AMO LED 112.

Latches 118 secure the first support 114 to the second support 116 when the flexible AMO LED 112 is retracted into the second support 116. It is understood that the second support 116 may contain the hardware and/or software configured to operate the flexible AMO LED 112. The second support 116 therefore may include one or more data connections 120 such that the graphical display 110 can be communicatively connected to the computer processor as described above.

In a non-limiting embodiment, a bracket of the job site workstation (not depicted) and the graphical display 110 may be configured such that the bracket couples to and supports the graphical display 110 both in the closed position with the AMO LED 112 retracted into the second support 116 as depicted in FIG. 10*b*, and in the open position wherein the first support 114 and the second support 116 are physically separate with the flexible AMO LED 112 stretched between the first support 114 and the second support 116. In one such embodiment, the bracket and the graphical display 110 may be configured with a first mating connection such as to secure the graphical display 110 in the closed position in which the first support 114 and second support 116 are horizontally aligned with the bracket to facilitate placing the workstation in the storage enclosed configuration. When the job site workstation is to be moved into the active configuration, the graphical display 110 may be detached from the bracket, and move into the open position and the first support 114 and the second support 116 may be configured to be perpendicularly aligned with the bracket such as to hold the graphical display 110 in a similar orientation to the job site workstation as with the graphical display such as depicted in FIGS. 4-7.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A workstation comprising:
   a body defining an open interior;
   a lid movably connected to the body, the lid being movable between an open position and a closed position, and the lid encloses the open interior when in the closed position;
   a bracket secured to the body and at least partially disposed within the open interior, at least a portion of the bracket being movable with respect to the body such that the bracket moves from a storage configuration wherein the bracket is positioned within the open interior and an active position in which at least a portion of the bracket extends outwardly from the open interior when the lid is in the open position, a front face of the bracket configured to couple to a graphical display; and
   a graphical display coupled to the front face of the bracket configured to couple to the graphical display, wherein the graphical display moves in conjunction with the bracket between the storage configuration and the active configuration, wherein the graphical display comprises a flexible display that extends between a first separable support and a second separable support, wherein the second separable support is configured to receive at least a portion of the flexible display, at least a portion of the flexible display being retractable into the second separable support.

2. The workstation of claim 1, wherein the bracket is further configured to couple to the first and second separable supports, when the first and second separable supports are in an open configuration with the flexible display extended therebetween, when the workstation is in the active position.

3. The workstation of claim 2, wherein the bracket is further configured to couple to the first and second separable supports when the first and second separable supports are in a closed configuration with the first and second separable supports latched to each other and at least a portion of the flexible display is retracted into the second support, when the bracket is in the storage configuration.

4. The workstation of claim 1, further comprising a surge protecting power supply disposed within the open interior wherein the graphical display is electrically coupled to the surge protecting power supply.

5. The workstation of claim 4, further comprising a computer processor and a computer readable medium disposed within the open interior, the computer processor being communicatively connected to the graphical display and executes computer readable code stored on the computer readable medium and operates the graphical display to present stored data.

6. The workstation of claim 1, further comprising:
a microenvironment about the graphical display and defined by at least the body and the lid; and
an environmental control apparatus disposed within the open interior such that the environmental control apparatus controls at least one environmental condition within the microenvironment.

7. The workstation of claim 6, wherein the environmental control apparatus comprises a fan and a filter, the fan draws ambient air from outside of the microenvironment into the microenvironment and the filter processes the ambient air before the air enters the microenvironment.

8. The workstation of claim 1, further comprising at least one support bar constructed of a resilient material and secured to the body within the open interior the support bar configured to engage a back face of the bracket and support the bracket within the open interior when the bracket is in the storage configuration.

9. The workstation of claim 1, further comprising a brace movable with respect to the body and the bracket, the brace configured to engage any of a plurality of slots, wherein the engagement of the brace with each of the slots of the plurality defines a different angle between the body and the bracket when the bracket is in the active configuration.

10. The workstation of claim 9, wherein the brace is movably secured to the back face of the bracket and the plurality of slots are fixed with respect to the body.

11. The workstation of claim 1, further comprising: a plurality of resilient blocks disposed within the open interior of the body, the plurality of resilient blocks configured to engage the back face of the bracket and support the bracket within the open interior when the bracket is in the storage configuration, the plurality of resilient blocks further define a plurality of open regions within the open interior.

12. A mobile workstation system, comprising:
a body defining an open interior;
a lid movably connected to the body, the lid being movable between an open position and a closed position, and the lid encloses the open interior when in the closed position;
a bracket secured to the body and at least partially disposed within the open interior, at least a portion of the bracket being movable with respect to the body such that the bracket moves from a storage configuration wherein the bracket is positioned within the open interior and an active position in which at least a portion of the bracket extends outwardly from the open interior when the lid is in the open position, a front face of the bracket configured to couple to a graphical display;
a graphical display coupled to the front face of the bracket configured to couple to the graphical display, wherein the graphical display moves in conjunction with the bracket between the storage configuration and the active configuration, wherein the graphical display comprises a flexible display that extends between a first separable support and a second separable support, wherein the second separable support is configured to receive at least a portion of the flexible display, at least a portion of the flexible display being retractable into the second separable support;
a computer processor disposed within the open interior, communicatively connected to the graphical display and operates the graphical display to present project data;
a communication device disposed within the open interior and communicatively connected to the computer processor;
a project information management (PIM) server communicatively connected to the computer processor through the communication device;
an office workstation remotely located from the computer processor and communicatively connected to the PIM server wherein project data from the office workstation is transferred to the computer processor through the PIM server.

13. The system of claim 12, wherein the computer processor receives user inputs identifying changes to the presented project data and the computer processor transfers the identified changes to the project data at the office workstation through the PIM server.

14. The system of claim 13, wherein the project data is stored at the PIM server and both the computer processor and the office workstation access the project data stored at the PIM server.

15. The system of claim 13, wherein the computer processor stores the received user inputs identifying changes to the presented project data and transfers the identified changes to the presented project data to the PIM server with the communication device at a time separate from when the user inputs are received.

16. A mobile workstation system, comprising:
a body defining an open interior;
a lid movably connected to the body, the lid being movable between an open position and a closed position, and the lid encloses the open interior when in the closed position;
a bracket secured to the body and at least partially disposed within the open interior, the bracket having a front face directed outward from the open interior and a back face directed inwards towards the open interior, at least a portion of the bracket being movable with respect to the body such that the bracket moves from a storage configuration wherein the bracket is positioned within the open interior and an active configuration in which at least a portion of the bracket extends outwardly from the open interior when the lid is in the open position; and
a graphical display configured to be removably coupled to the front face of the bracket wherein the bracket is configured to removably receive the graphical display, wherein when coupled to the front face of the bracket, the graphical display moves in conjunction with the bracket between the storage configuration and the active configuration, wherein the graphical display is a flexible OLED display connected to a first side and a second side, the first side and the second side configured to receive at least a portion of the OLED display within the respective first side and second side in a retracted configuration and configured to be movable with respect to one another such that the OLED display extends between separated first side and second side in an extended position, wherein the bracket is configured to receive the flexible OLED display in the extended configuration when the bracket is in the active configuration and the bracket is configured to receive the flexible OLED display in the retracted configuration when the bracket is in the storage configuration.

17. A workstation comprising:
a body defining an open interior;
a lid movably connected to the body, the lid being movable between an open position and a closed position, and the lid encloses the open interior when in the closed position;
a bracket secured to the body and at least partially disposed within the open interior, at least a portion of the bracket being movable with respect to the body such that the bracket moves from a storage configuration wherein the bracket is positioned within the open interior and an active position in which at least a portion of the bracket extends outwardly from the open interior when the lid is in the open position, a front face of the bracket configured to couple to a graphical display, wherein the bracket comprises:
a front plate secured to the body within the open interior;
a bottom plate hingedly connected to the front plate and configured to support a bottom of the graphical display when the bracket is in the active configuration; and
a back plate generally perpendicularly secured to the bottom plate and extending away from the bottom plate, wherein the back plate couples to the graphical display, and the back plate at least partially extends outwardly from the open interior when the bracket is in the active configuration; and
a graphical display coupled to the front face of the bracket configured to couple to the graphical display, wherein the graphical display moves in conjunction with the bracket between the storage configuration and the active configuration.

18. The workstation of claim 17, further comprising a surge protecting power supply disposed within the open interior wherein the graphical display is electrically coupled to the surge protecting power supply.

19. The workstation of claim 17, further comprising at least one support bar constructed of a resilient material and secured to the body within the open interior the support bar configured to engage a back face of the bracket and support the bracket within the open interior when the bracket is in the storage configuration.

20. The workstation of claim 17, further comprising a brace movable with respect to the body and the bracket, the brace configured to engage any of a plurality of slots, wherein the engagement of the brace with each of the slots of the plurality defines a different angle between the body and the bracket when the bracket is in the active configuration.

* * * * *